United States Patent [19]

Bodnar et al.

[11] 4,329,229

[45] May 11, 1982

[54] METHOD OF POTTING THE ENDS OF A BUNDLE OF HOLLOW FIBERS POSITIONED IN A CASING

[75] Inventors: Bert S. Bodnar, Park Ridge; William J. Schnell, Wheeling, both of Ill.

[73] Assignee: Baxter Travenol Laboratories, Inc., Deerfield, Ill.

[21] Appl. No.: 89,016

[22] Filed: Oct. 29, 1979

Related U.S. Application Data

[60] Division of Ser. No. 928,477, Jul. 27, 1978, Pat. No. 4,227,295, which is a continuation-in-part of Ser. No. 888,071, Mar. 20, 1978, abandoned.

[51] Int. Cl.³ .............................................. B01D 31/00
[52] U.S. Cl. ................................. 210/321.2; 210/450
[58] Field of Search ................... 210/450, 23 H, 23 F, 210/22, 321 R, 321 A, 321 B; 264/258, 221

[56] References Cited

U.S. PATENT DOCUMENTS

| | | | |
|---|---|---|---|
| 3,442,002 | 5/1969 | Geary, Jr. et al. | 264/258 X |
| 3,882,024 | 5/1975 | Holmes et al. | 210/450 X |
| 4,211,597 | 7/1980 | Lipps et al. | 210/321 R X |
| 4,219,426 | 8/1980 | Spekle et al. | 210/450 X |

FOREIGN PATENT DOCUMENTS

| | | | |
|---|---|---|---|
| 1175687 | 12/1969 | United Kingdom | 210/321.3 |
| 1515452 | 6/1978 | United Kingdom | 55/158 |
| 1550242 | 8/1979 | United Kingdom | 210/321.3 |
| 1550774 | 8/1979 | United Kingdom | 55/158 |

Primary Examiner—Frank A. Spear, Jr.
Attorney, Agent, or Firm—Paul C. Flattery; Garrettson Ellis

[57] ABSTRACT

An elongated, tubular casing contains a bundle of hollow fibers with closure members at both ends thereof. Each closure member comprises a cup-shaped member connected in sealing relation at its rim to the ends of the tubular casing. Each cup-shaped member also defines an extended cylindrical portion positioned remotely from the rim having an inner diameter less than the relatively enlarged, inner diameter portion, and the tubular casing carries a hollow, elongated member or potting boat during manufacture containing a curable liquid sealant, as a means for inserting the sealant into the ends of the tubular casing by centrifugation.

6 Claims, 10 Drawing Figures

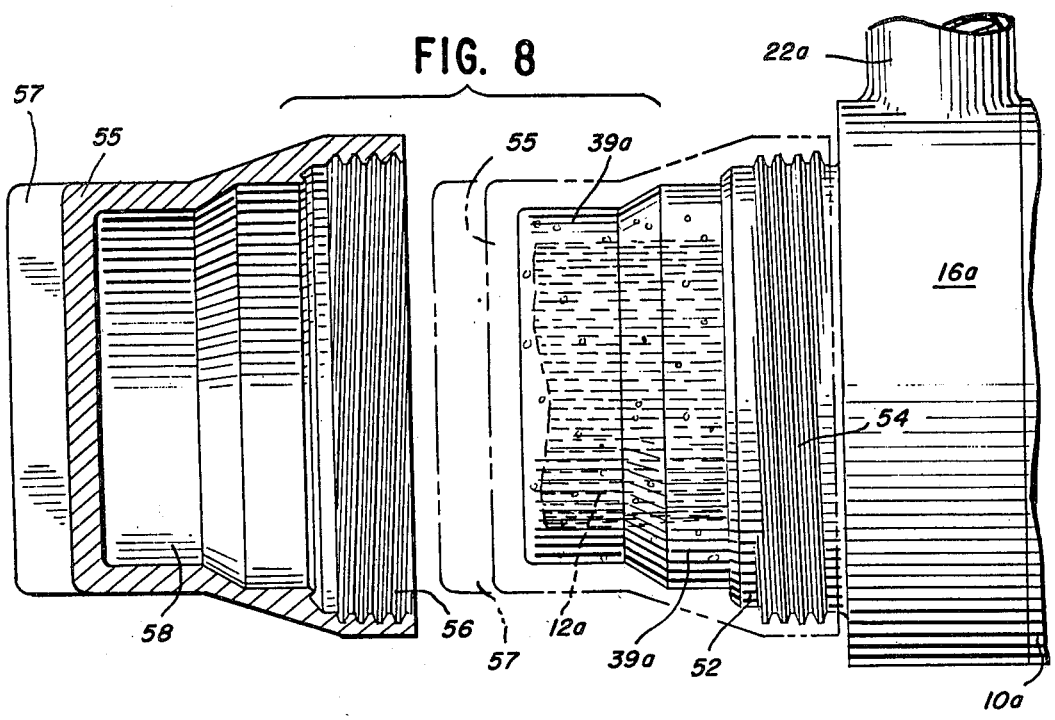
FIG. 8
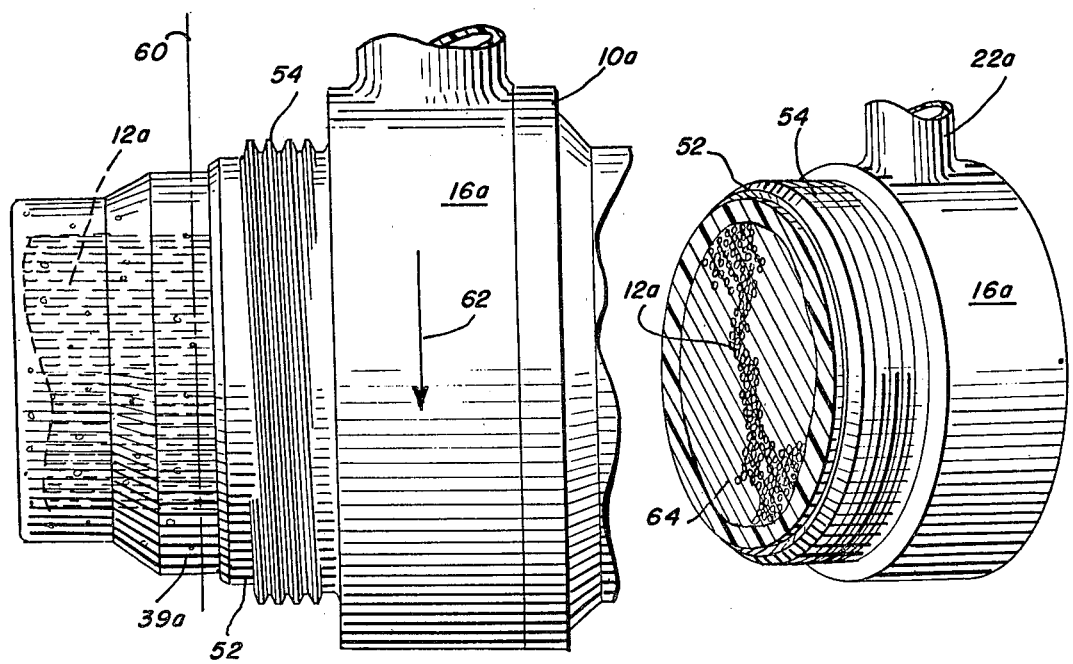
FIG. 9
FIG. 10

METHOD OF POTTING THE ENDS OF A BUNDLE OF HOLLOW FIBERS POSITIONED IN A CASING

CROSS-REFERENCE TO RELATED APPLICATION

This application is a division of application Ser. No. 928,477, filed July 27, 1978, Now U.S. Pat. No. 4,227,295, which, in turn, is a continuation-in-part of application Ser. No. 888,071, filed Mar. 20, 1978, now abandoned.

BACKGROUND OF THE INVENTION

Hollow fiber dialyzers are a well-known and increasingly popular form of dialyzer for use as artificial kidneys, as well as other desired uses. One liquid for dialysis, typically blood, passes through the bore of a bundle of hollow, semi-permeable fibers, while a second dialysis liquid flows through the bundle against the exterior surfaces of the fibers.

Conventionally, as in U.S. Pat. Nos. 3,492,698 and 3,442,002, the hollow fiber bundles are placed in a generally tubular casing, and the ends are potted within the casing to provide a seal. After cure of the potting compound, the potted areas are sliced to expose the bores of the fibers in the bundle, and exterior manifold members are placed over the ends of the casing so that blood or other liquid can be conveyed to the ends of the fibers at one end of the casing, and collected from the other ends of the fibers at the other end of the casing.

In the usual manufacturing techniques, the casing is spun about an axis of rotation extending through the center of the casing, so as to place a centrifugal force upon the potting compound at opposite ends of the casing while potting compound is added through the ends, and as it cures. The ends of the casing are typically sealed by a temporary mechanical end seal of the centrifuge apparatus, to prevent the loss of sealant out of the open ends of the casing.

It has been found that it is difficult to seal the potting compound since the open ends are under a substantial G-force from the centrifuge. Accordingly, some leakage of sealant often takes place, even when expensive, high-performance mechanical end seals are provided to the centrifuge and apparatus.

The invention of this application provides a means for potting the ends of a hollow fiber dialyzer without the use of a mechanical end seal, providing a simplification of the system during centrifugation. Also, this invention provides a potting system in which less sealant per unit may be used in each potting operation.

Likewise, further efficiencies of operation may be provided, for example, by providing a carousel-type of assembly operation, in which a series of potting centrifuges are placed upon a carousel platform which moves the potting centrifuges in a circular path, presenting them one by one to the operator for unloading and reloading, with a substantial saving of sealant in the operations.

DESCRIPTION OF THE INVENTION

In accordance with this invention, a method is provided for potting the ends of a bundle of hollow fibers positioned in a usually tubular casing. The fiber bundle is inserted into the casing through an open end thereof. Then the end or ends of the casing are sealingly closed with preferably rigid casing closure member means to effectively seal the casing ends, for example by solvent or ultrasonic sealing of the closures to the casing to integrally incorporate the closures and casing. Alternatively, the casing ends and casing closure members may carry screw threads to that the closure members may be screwed on the ends for sealing and later removed.

After closing the casing ends with the closure members, one spins the casing ends about an axis of rotation extending through a central portion of the casing, while inserting curable liquid sealant through side apertures in the casing. Accordingly, the liquid sealant migrates by the centrifugal force of the spinning to the interior ends of the casing, to pot the ends of the fiber bundle within the casing. After the liquid sealant is cured, one may cut through the closure member means, and also the cured sealant and hollow fibers at each casing end, to expose the bores of the hollow fibers. Alternatively, one may simply remove the closure member means as described above and then cut the sealant and fibers.

Thereafter, manifold means may be conventionally placed on each end of the casing to facilitate liquid flow through the open bores of the fibers in the bundle.

Preferably, the sealant may be provided through the side apertures in the casing by attaching the outlet port of a hollow, elongated member (known as a potting boat) to the side apertures of the casing, and placing the liquid sealant into the hollow, elongated member prior to spinning the casing. The outlet ports of the potting boat are preferably positioned at its respective ends.

Accordingly, upon centrifugation as described above, the sealant is driven to the respective ends of the potting boat, and from there through the outlet ports and side apertures into the casing, where it migrates radially outwardly into the casing closure member means to surround and seal the ends of the fiber bundle. This is done without spilling, because the casing closure member means can provide an absolute seal, greatly improved over any temporary seal member carried by the centrifuge which has been previously used to pot the ends of a casing from the exterior, while at the same time attepting to hold the sealant in position against the centrifugal force generated by the centrifuge.

After the sealant has cured, the rigid casing closure member means is then opened, and the potted bundle end may be cut in a two-step process as follows: first, a circumferential channel or notch may be cut through the casing or casing closure member, for example, by the use of a parting tool, to expose the potted bundle underneath the generally rigid plastic of the casing closure members. Alternatively, the casing closure member may be simply removed, for example, by unscrewing it. Thereafter, the potted bundle end may be conventionally sliced with a precision meat slicer or the like, through the cut circumferential channel or notch, or at its exposed end where the closure member is removed, to provide a flat surface which includes the opened bores of the fibers in the bundle.

If desired, the rigid casing closure means may comprise plastic cup-shaped members, each sealed at their rims to an end of the tubular casing. A portion of each cup-shaped member adjacent the rim may be of relatively enlarged diameter, relative to the tubular casing, to serve as a manifold means for side apertures in the casing, which in their ultimate use may serve as the inlet and outlet ports for one of the fluids to be dialyzed.

Each of the cup-shaped members may also define an extended cylindrical portion, preferably of equal or greater length than the enlarged diameter portion, positioned remotely from the rim and having a diameter of less than the relatively enlarged-diameter portion. This segment of the cup-shaped member receives an end of the hollow fiber bundle, and is filled with the potting compound. Because of its reduced diameter, the amount of potting compound used is reduced over various prior art techniques.

Alternatively, the casing closure means may simply be separate end plates, attached to and sealing each end of the casing after insertion of the fiber bundle. In this case, the casing itself may be cut open after the centrifugation step.

Referring to the drawings,

FIG. 8 is an elevational view of the end of a hollow fiber bundle in another embodiment of the casing and associated cup-shaped casing closure member of this invention.

FIG. 9 is a fragmentary elevational view of an end of the casing and fiber bundle shown in FIG. 8, showing how the projected potted fiber bundle end may be cut.

FIG. 10 is a fragmentary perspective view of an end of the casing and fiber bundle shown in FIG. 9 at the completion of the cutting step.

Figure 1:
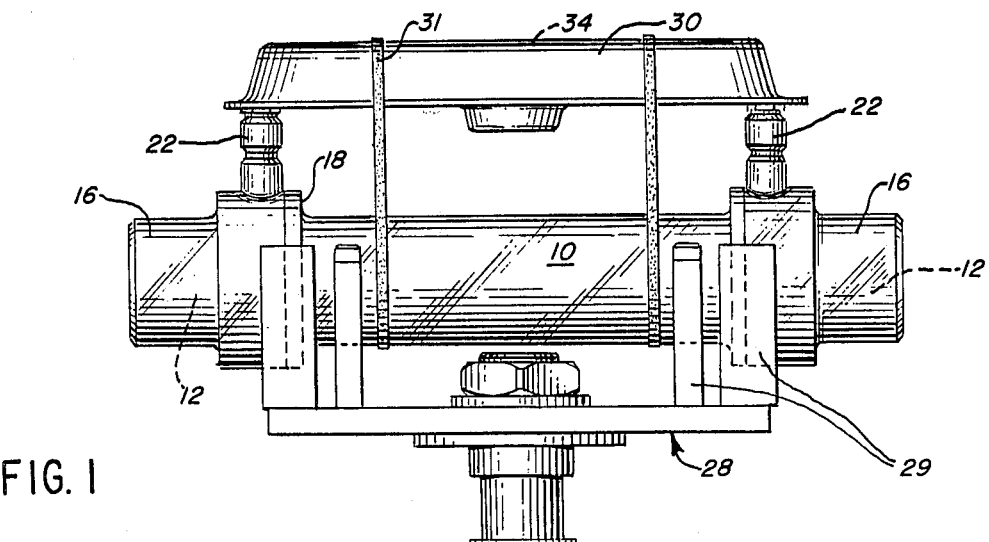
FIG. 1 is an elevational view, shown in partially diagramatic form, of a hollow fiber bundle positioned in a casing and carried by a centrifuge in accordance with this invention.

Referring to FIGS. 1 through 6, a method and apparatus for assembling a potted, hollow fiber bundle within a casing is disclosed. A central, hollow tubular casing 10 is shown to be initially loaded with a hollow fiber bundle 12, which preferably may be made in accordance with the disclosures of Fitzgerald, et al., U.S. patent application Ser. No. 767,711, filed Feb. 11, 1977, or by any other desired technique for assembling fiber bundles. Hollow fiber bundle 12 is shown to be longer than central casing 10, so that it protrudes out of both ends of the casing 10 by a predetermined length. It is also preferable for the ends of fiber bundle 12 to be surrounded and secured with tape 14 prior to insertion of the bundle into casing 10, for ease of insertion and to prevent disruption of the bundled array of fibers.

Thereafter, generally cup-shaped casing closure members 16 are sealed onto the ends 18 of casing 10, to surround and enclose the fiber bundle 12 by ultrasonic welding or the like for a permanent, hermetic seal bond. As shown, the sealing cup member 16 defines a closed end wall 20, which may be positioned to be slightly spaced from its associated end of the fiber bundle 12.

Also, in this embodiment, the cup-shaped closure member means 16 carries side aperture member 22 as an integral part thereof.

Furthermore, a portion 24 of the cup-shaped sealing member 16 is of relatively enlarged diameter, relative to tubular casing 10, to serve as a manifold area for fluids passing into or out of side apertures 22. Another extended, cylindrical portion 26 of the cup-shaped sealing member 16, which is preferably of equal or greater length to section 24, has a diameter which is less than the relatively enlarged diameter portion 24 and is, as stated before, positioned to receive an end of the hollow fiber bundle 12.

Figure 2:
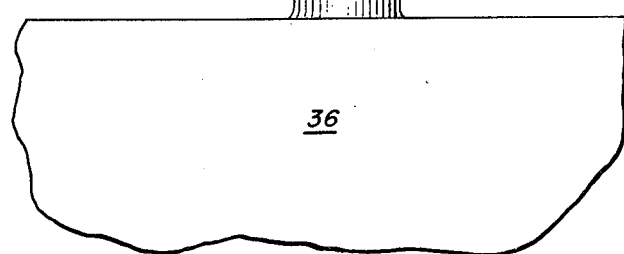
FIG. 2 is a longitudinal sectional view of one end of the casing and fiber bundle shown in FIG. 1, also showing the sealant migrating from the potting boat to the respective ends of the casing.

The structure as shown in FIG. 2 typically represents the structure as it is at both ends of the casing, with one end being omitted for purposes of simplicity of disclosure.

Inner flange 25 may be used to help center bundle 12.

After sealing of a cup-shaped, rigid casing closure member means 16 at each end of casing 10, by ultrasonic welding or any other desired technique, the resulting assembly is mounted on a centrifuge rotor 28, operated by centrifuge 36, both of which may be of conventional design, being adapted to firmly hold casing 10 and its related parts. Arms 29 of the rotor grip casing 10 and end members 16.

A hollow, elongated potting boat 30 which may be made of thermoformed plastic or the like, is attached with its outlet ports 32 positioned within side aperture members 22 as illustrated in FIG. 2. Any desired retention means may be used. For example, the end of each outlet port 32 may be slightly bulbous, as shown, for a friction fit within aperture members 22, and the boat 30 may be attached to casing 10 by rubber bands 31.

The top of potting boat 30 defines an open aperture 34 into which liquid-curable sealant, for example polyurethane sealant, may be inserted, typically while the centrifuge is in operation. This is after installation of casing 10 and the potting boat 30 on centrifuge rotor 28.

The centrifuge 36 spins casing 10 about an axis of rotation extending through the center of the casing. The urethane sealant 39 is driven radially outwardly toward both ends of the potting boat 30. From there, the sealant migrates through outlet port 32 and side aperture member 22, to continue the flow radially outwardly along the upper edge of sealing cup members 16, to fill the remotely positioned portion 26 of the sealing cup member, surrounding and enveloping the ends of fiber bundle 12. Typically, an amount of sealant is used sufficient to permit the filling of portion 26 of the sealing cup member up to about the level of flange 38, which defines the junction between portion 26 and portion 24 of the sealing cup member.

As a result of this, less sealant is used, while at the same time the bundle 12 is thoroughly potted at its ends, and bonded to the interior of the casing assembly.

After the sealant 39 has sufficiently cured, centrifuge 36 is stopped. Casing 10 and its related parts may be removed from the centrifuge, and potting boat 30 may be removed as well, for either reuse or discard as desired.

Figure 3:
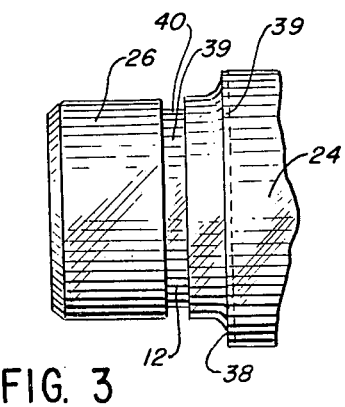
FIG. 3 is a view similar to FIG. 2 showing how the closure member means is cut through by cutting of a circumferential channel about the closure member.
Figure 4:
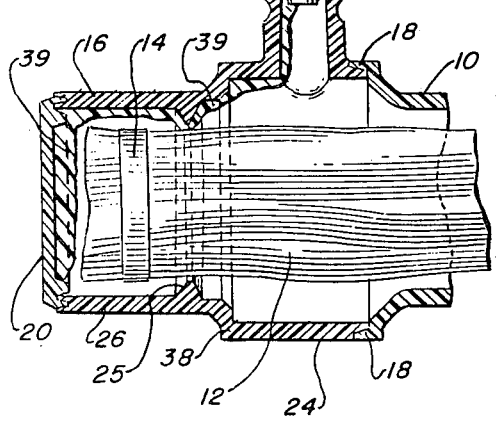
FIG. 4 is a view similar to FIG. 2 showing how the end portion of the closure member is removed and the potted ends of the fiber bundles are sliced.
Figure 4:
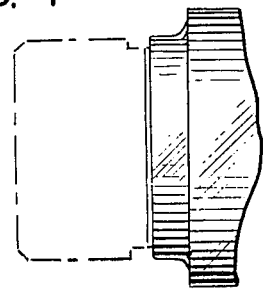

After the sealant is completely cured, the casing assembly may be opened at its ends, typically by the initial step of cutting a circumferential channel or notch 40 through each closure member means, specifically in section 26 of the closure member cup. This is as shown in FIG. 3, and may be done with a parting tool if desired, to expose fiber bundle and cured sealant at the bottom of notch 40. Thereafter, a commercial meat slicer or equivalent machine may be used to cut through groove 40 to sever the potted bundle end and remove the ends of the casing assembly 10. As shown in FIG. 4, several sequential slicing cuts may be used as desired in order to obtain a smooth cut, in which the maximum number of fibers in the bundle have open, exposed bores, and also to provide a smooth surface which does not stimulate blood clotting.

Thereafter, a conventional manifold member 41 may be added to each end. It is preferable for the side port members 22 of the casing to be parallel to each other, to facilitate attachments to the potting boat 30.

Figure 7:
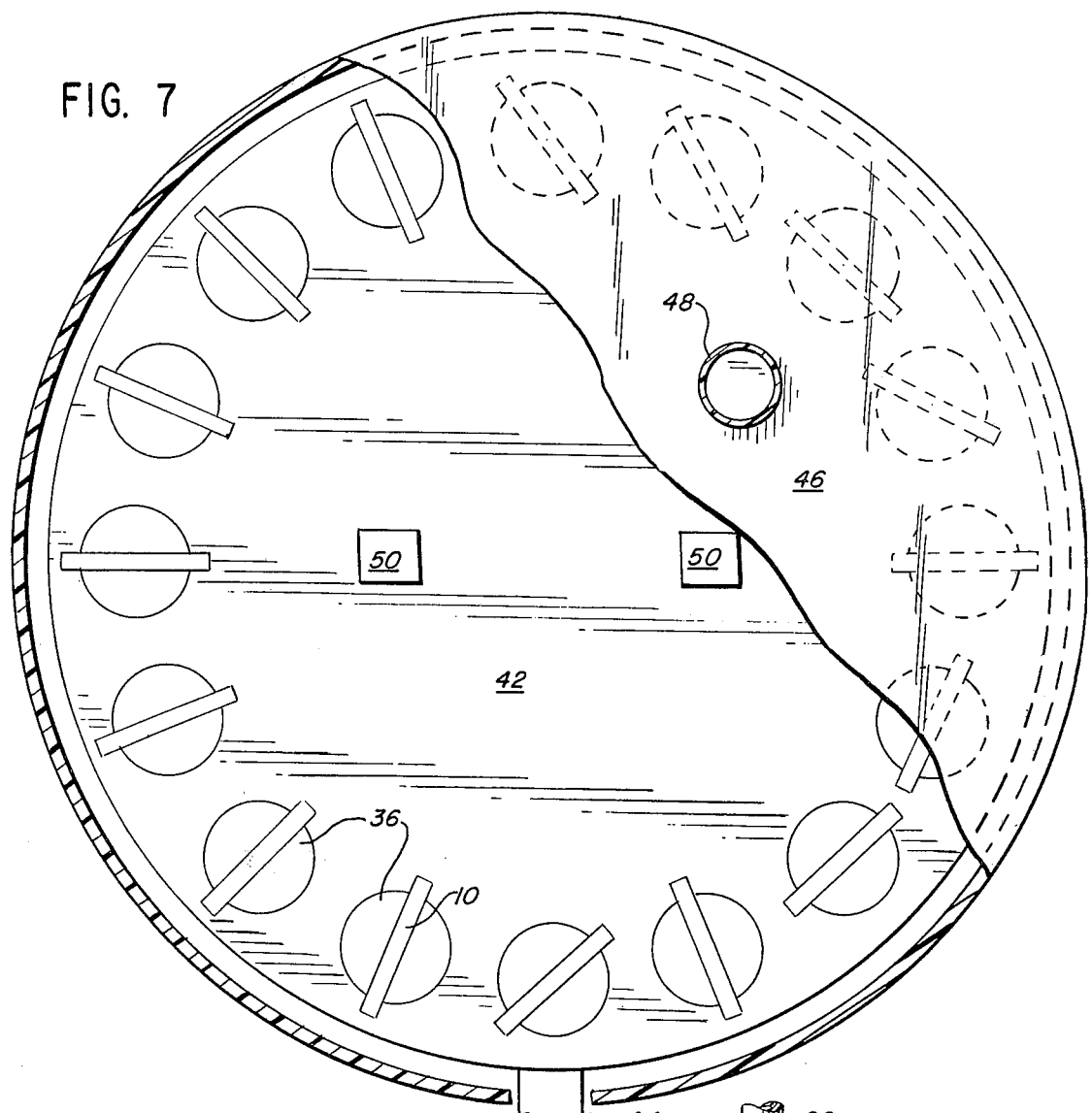
FIG. 7 is a plan view of an indexing carousel for semi-automated mass production of potted hollow fiber bundles in casings, in accordance with this invention.
Figure 5:
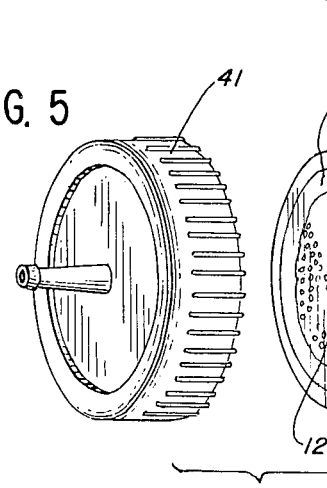
FIG. 5 is a perspective view of a separate, hollow tubular casing of this invention into which a fiber bundle is placed, and a separately molded closure member, which is adapted to be sealed to an end of the casing.
Figure 6:
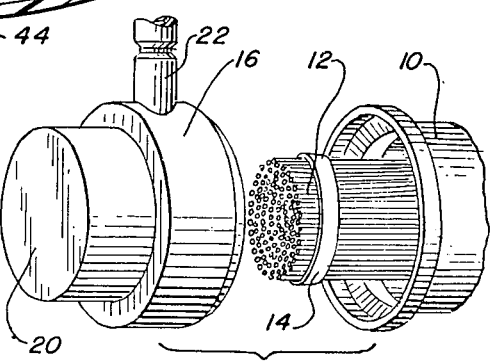
FIG. 6 is a perspective view of the finished, cut tubular casing and a manifold member about to be attached thereto.

Referring to FIG. 7, an industrial layout making use of the apparatus and method of this invention is disclosed.

Carousel platform 42 carries a plurality of centrifuges 36 in a series of stations for continuous and multiple manufacture of potted, hollow fiber bundle casings on a semiautomated basis. Each centrifuge station 36 is adapted for practicing the present invention as described above.

Accordingly, as each centrifuge station 36 is indexed to position 44 by rotational indexing of the carousel 42 on a predetermined schedule, it may be unloaded of its processed hollow fiber bundle casing, and reloaded with a new casing and potting boat. Then, the predetermined amount of sealant is inserted into the potting boat after the centrifuge 36 is turning, and the carousel platform index onward to present another centrifuge 36 to work station 44, while the freshly-loaded centrifuge is rotationally moved away from the station 44 for automatic centrifugal processing for any desired length of time.

Accordingly, one operator can, if desired, service all of the centrifuges on the carousel platform 42, while the remaining centrifuges 36 operate until the allotted cure time has elapsed.

Preferably, carousel platform 42 is enclosed in a housing 46, equipped with a vent pipe 48 to remove fumes resulting from the curing of the sealant.

Also, carousel platform 42 may carry recirculating forced air heaters 50 to heat the hollow fiber bundle casings 10 and their related members to a temperature which is preferably higher than that of the polyurethane sealant, prior to injecting of the polyurethane into the casing 10 for potting. The urethane then tends to bond first to the dialyzer casing wall, and then as it builds in volume, moves slowly inwardly to bond the fibers together, providing an improved overall seal. Generally, a temperature of 130° F. is desirable.

Alternatively, a second operating station could be provided, for example 180° around from the first work station 44, or any other arrangement may be used as may be desirable.

Referring now to FIGS. 8 through 10, another embodiment of the invention of this application is disclosed which may be identical in structure and manufacturing technique to the embodiment described in FIGS. 2 through 7, except as otherwise indicated below.

Hollow tubular casing 10a contains a hollow fiber bundle 12a in a manner similar to the previous embodiment, with the ends of bundle 12a projecting from each end of casing 10a.

In this embodiment, side aperture member 22a may be carried by end member 16a, which is sealed to tubular casing 10a, as in the previous embodiment.

In distinction from the previous embodiment, end member 16a defines a terminal sleeve member 52 which is equipped with helical screw threads 54. The opposed end of casing 10a and end member 16a may be of similar design to that shown in FIG. 8.

After insertion of fiber bundle 12a into tubular casing 10a a generally cup-shaped casing closure member 55 is provided at each end of end member 16a. Closure member 55, which carries mating helical screw threads 56 at its lip, may be simply screwed onto each end of member 16a to provide a hermetic seal to the ends of casing 10a. The emplaced cup-shaped casing closure member 55 is shown in phantom lines in FIG. 8.

Closure member 55 defines a diametrically disposed blade 57 across its outer end to facilitate the emplacement and removal of closure 55 on and from casing end members 16a.

Casing 10a and the respective closure members 16a, 55 at each end of casing 10a may be attached through side apertures 22a to a potting boat 30 in a manner similar to that shown in FIG. 1. The centrifuge is activated to cause the urethane sealant 39a to flow to the ends of casing 10a and to cure in a manner analogous to that shown and described in the previous embodiment. The urethane sealant 39a is added to fill each of the sealing members 55 and preferably part of members 16a so that the inner edge of the sealant is at least substantially within sleeve 52. As shown in FIG. 8, the sealant is then cured to assume the outline of the inner chamber of each cup-shaped casing closure member 55. If desired, the apparatus of FIG. 7 and the preferred methods of potting described previously may be used.

After the potting and curing step has taken place, the centrifugation process is terminated, and each of the closure members 55 is removed by simple unscrewing of the closure member from the threaded sleeve 52 on end members 16a. Thereafter, the ends of fiber bundle 12a, potted with cured sealant 39a, are cut off, preferably by means of a round knife 60 positioned adjacent each end of the casing 10a. Preferably, the casing 10a may be placed within a rotatable drum with its ends projecting, and then rotated about its longitudinal axis while being brought into cutting contact with a pair of knives 60, positioned to make the cut at each end of casing 10a at the desired positions. Arrow 62 indicates the direction of rotation of casing 10a and its associated parts.

The result of this step is to expose the bores of the hollow fibers of bundle 12a in a flat end surface 64, which comprises the ends of the fibers of bundle 12a and cured sealant, with surface 64 generally projecting slightly outwardly from the outer end of each sleeve 52 defined by end member 16a.

Following this, a conventional manifold member 41 of the type used in the previous embodiment, but preferably equipped with screw threads, may be simply screwed onto threads 54, to provide a tightly sealed manifold member at each end of the casing 10a, resulting in a finished dialyzer.

By the above techniques, a simple means is provided to eliminate complex sealing apparatus carried by the centrifuge for preventing the outward migration and leakage of the sealant from the ends of the casing 10 or 10a, with the complex centrifuge seals being replaced with a simple and disposable cup-shaped member having improved sealing reliability.

The above has been offered for illustrative purposes only and is not intended to limit the invention of this application, which is as defined in the claims below.

That which is claimed is:

1. An elongated tubular casing containing a bundle of hollow fibers, said casing including casing closure member means at both ends thereof, and a pair of side apertures positioned in said casing, each closure member means comprising a cup-shaped member connected in sealing relation at its rim to the ends of said tubular casing, a portion of said cup-shaped member adjacent said rim being of relatively enlarged inner diameter, relative to said tubular casing, each said cup-shaped member also defining an extended cylindrical portion, positioned remotely from said rim, having an inner diameter less than said relatively enlarged inner diameter portion and receiving an end of said hollow fiber bundle, said tubular casing carrying a hollow, elongated member which defines outlet ports connected to the side apertures of said casing, said hollow, elongated member containing a curable liquid sealant.

2. The elongated, tubular casing of claim 1, in which said pair of side apertures are positioned adjacent opposite ends of said casing and generally parallel to each other.

3. The elongated, tubular casing of claim 2, in which each extended cylindrical portion of the rigid closure member means is cut through with a circumferential channel, and said extended, cylindrical portion is filled with cured sealant, surrounding and enveloping the fiber bundle end positioned therein.

4. The elongated, tubular casing and attached hollow, elongated member of claim 3, in which said attached hollow, elongated member comprises a thin-walled plastic hollow shell, said outlet ports being positioned at opposite ends thereof.

5. The elongated tubular casing of claim 1 in which the cup-shaped rigid closure member means define helical threads at their inner rims, and the ends of said tubular casing define helical threads at their outer ends, said cup-shaped closure member means being removably carried by the interlocking of said helical threads on the ends of said closure member in sealing relation thereto.

6. The elongated tubular casing of claim 1 in which each cup-shaped member is integrally sealed at its rim to an end of said tubular casing.

* * * * *